United States Patent
Hu et al.

(10) Patent No.: US 9,965,430 B2
(45) Date of Patent: May 8, 2018

(54) INTEGRATED CIRCUIT AND OPERATION METHOD OF SERIALIZER/DESERIALIZER PHYSICAL LAYER CIRCUIT THEREOF

(71) Applicant: Faraday Technology Corp., Hsinchu (TW)

(72) Inventors: Yuan-Min Hu, Hsinchu (TW); Yin-Fu Lin, Hsinchu (TW); Shan-Chih Wen, Hsinchu (TW)

(73) Assignee: Faraday Technology Corp., Hsin-Chu (TW)

( * ) Notice: Subject to any disclaimer, the term of this patent is extended or adjusted under 35 U.S.C. 154(b) by 176 days.

(21) Appl. No.: 15/001,196

(22) Filed: Jan. 19, 2016

(65) Prior Publication Data

US 2017/0154002 A1    Jun. 1, 2017

(30) Foreign Application Priority Data

Nov. 27, 2015 (TW) .............................. 104139597 A (51) Int. Cl.
*G06F 13/00* (2006.01)
*G06F 13/40* (2006.01)

(52) U.S. Cl.
CPC ................................. *G06F 13/4068* (2013.01)

(58) Field of Classification Search
CPC .................................................. G06F 13/4068
See application file for complete search history.

(56) References Cited

U.S. PATENT DOCUMENTS

| 6,958,613 | B2 * | 10/2005 | Braun ..................... G06F 11/24 324/601 |
| 7,269,043 | B2 * | 9/2007 | Lee .......................... G11C 5/04 365/201 |
| 8,989,254 | B2 | 3/2015 | Jing et al. |

(Continued)

FOREIGN PATENT DOCUMENTS

| CN | 104009823 | 8/2014 |
| TW | 201203981 | 1/2012 |
| WO | 2015163986 | 10/2015 |

OTHER PUBLICATIONS

"Office Action of Taiwan Counterpart Application", dated Feb. 2, 2017, p. 1-p. 4.

*Primary Examiner* — Jing-Yih Shyu
(74) *Attorney, Agent, or Firm* — Winston Hsu (57) ABSTRACT

An integrated circuit and an operation method of a SERDES PHY layer circuit thereof are provided. When the SERDES PHY layer circuit is in a calibration preparation state and a signal of a first calibration input pin is an enable state, or when the SERDES PHY layer circuit is in the calibration preparation state, and signals of first and second calibration input pins are in the enable state, the SERDES PHY layer circuit enters a calibration state (using a reference resistor for current calibration). After the current calibration is completed, the SERDES PHY layer circuit enters a calibration completion state (without using the reference resistor and connecting the first calibration input pin to the first calibration output pin). The SERDES PHY layer circuit sets the signal of the first calibration output pin to a disable state when the SERDES PHY layer circuit is not in the calibration completion state.

6 Claims, 6 Drawing Sheets

(56) References Cited

U.S. PATENT DOCUMENTS

| | | | |
|---|---|---|---|
| 2004/0104829 A1* | 6/2004 | Shi | H03M 9/00 |
| | | | 341/101 |
| 2013/0007562 A1* | 1/2013 | Fai | G06F 11/1004 |
| | | | 714/758 |
| 2015/0180760 A1* | 6/2015 | Rickard | H04L 25/00 |
| | | | 370/252 |

* cited by examiner

INTEGRATED CIRCUIT AND OPERATION METHOD OF SERIALIZER/DESERIALIZER PHYSICAL LAYER CIRCUIT THEREOF

CROSS-REFERENCE TO RELATED APPLICATION

This application claims the priority benefit of Taiwan application serial no. 104139597, filed on Nov. 27, 2015. The entirety of the above-mentioned patent application is hereby incorporated by reference herein and made a part of this specification.

BACKGROUND OF THE INVENTION

Field of the Invention

The invention relates to electronic circuit, and particularly relates to an integrated circuit and an operation method of a serializer/deserializer (SERDES) physical (PHY) layer circuit.

Description of Related Art

Figure 1:
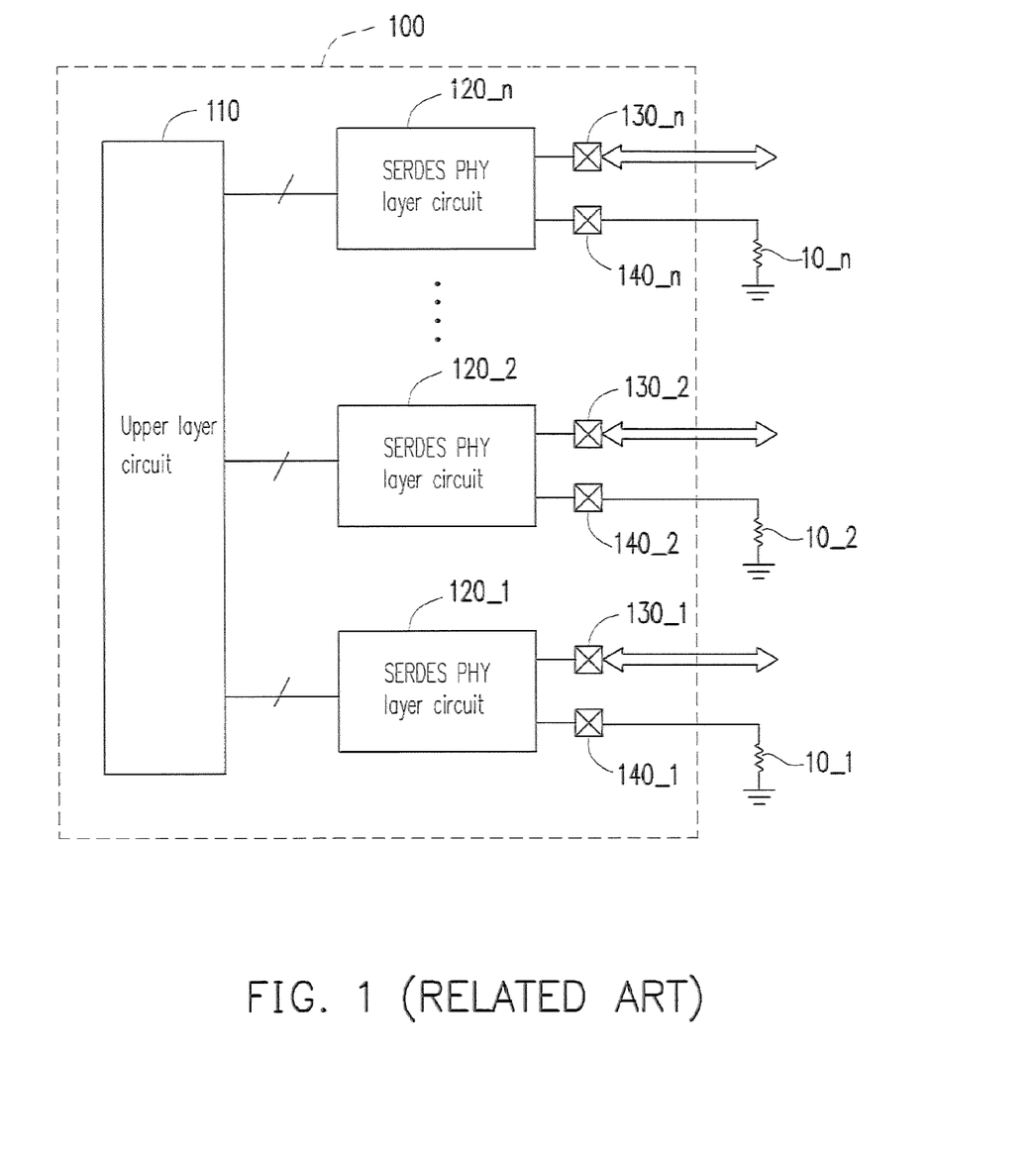
FIG. 1 is a block schematic diagram of an integrated circuit configured with general serializer/deserializer (SERDES).

Serializer/deserializer (which is generally referred to as SERDES) may transform parallel data into serial data, or transform serial data into parallel data. FIG. 1 is a block schematic diagram of integrated circuit configured with general SERDES. Referring to FIG. 1, the integrated circuit 100 includes an upper layer circuit 110 and a plurality of SERDES physical layer (PHY layer) circuits. For example, n SERDES PHY layer circuits $120\_1, 120\_2, \ldots, 120\_n$ are illustrated in FIG. 1, where n is any integer determined according to an actual design requirement.

The upper layer circuit 110 can be a data link layer, a network layer and/or other functional circuit. The SERDES PHY layer circuits $120\_1\text{-}120\_n$ respectively have a data pin. The data pins of the SERDES PHY layer circuits $120\_1\text{-}120\_n$ are electrically coupled to the upper layer circuit 110. The SERDES PHY layer circuits $120\_1\text{-}120\_n$ may transform parallel data output from the upper layer circuit 110 into serial data, and output the serial data to a circuit outside the integrated circuit 100 through data pads $130\_1, 130\_2, \ldots 130\_n$; and/or receive serial data from the circuit outside the integrated circuit 100 through the data pads $130\_1\text{-}130\_n$, and transform the serial data into parallel data for providing to the upper layer circuit 110.

The SERDES PHY layer circuits $120\_1\text{-}120\_n$ respectively have a reference resistor pin. The reference resistor pins of the SERDES PHY layer circuits $120\_1\text{-}120\_n$ are electrically connected to reference resistor pads $140\_1, 140\_2, \ldots, 140\_n$. The reference resistor pads $140\_1\text{-}140\_n$ are respectively connected to reference resistors $10\_1, 10\_2, \ldots, 10\_n$. During an initialization period after power is supplied to the SERDES PHY layer circuits $120\_1\text{-}120\_n$, the SERDES PHY layer circuits $120\_1\text{-}120\_n$ may simultaneously enter a calibration state, such that the SERDES PHY layer circuits $120\_1\text{-}120\_n$ respectively perform current calibration by using the reference resistors $10\_1\text{-}10\_n$ electrically connected to the reference resistor pads $140\_1\text{-}140\_n$. In case that a reference voltage is supplied to the reference resistors $10\_1\text{-}10\_n$, the reference resistors $10\_1\text{-}10\_n$ may respectively provide corresponding reference currents to the SERDES PHY layer circuits $120\_1\text{-}120\_n$, and the SERDES PHY layer circuits $120\_1\text{-}120\_n$ may respectively perform the current calibration according to the reference currents.

Generally, resistances of the reference resistors $10\_1\text{-}10\_n$ are the same. If the SERDES PHY layer circuits $120\_1\text{-}120\_n$ may commonly use a single reference resistor, the amount of the reference resistors $10\_1\text{-}10\_n$ can be greatly decreased. However, the SERDES PHY layer circuits $10\_1\text{-}120\_n$ cannot commonly use a same reference resistor since the SERDES P layer circuits $120\_1\text{-}120\_n$ may simultaneously enter the calibration state (i.e. simultaneously use the same reference resistor). When the SERDES PHY layer circuits $120\_1\text{-}120\_n$ simultaneously use the same reference resistor, the reference current required for the current calibration is changed due to a parallel effect, which influences a result of the current calibration.

SUMMARY OF THE INVENTION

The invention is directed to an integrated circuit and an operation method of a SERializer/DESerializer PHYsical layer (SERDES PHY layer) circuit, in which a same reference resistor is commonly used.

An embodiment of the invention provides an integrated circuit. The integrated circuit includes a first reference resistor pad, an upper layer circuit and a first SERDES PHY layer circuit. The first reference resistor pad is configured to electrically connect a reference resistor located outside the integrated circuit. The first SERDES PHY layer circuit has a data pin electrically coupled to the upper layer circuit, and is configured to transform first parallel data output by the upper layer circuit into first serial data, or transform second serial data into second parallel data for providing to the upper layer circuit. The first SERDES PHY layer circuit further has a reference resistor pin, a first calibration input pin and a first calibration output pin. The reference resistor pin is electrically connected to the first reference resistor pad. When the first SERDES PHY layer circuit is in a calibration preparation state and a signal of the first calibration input pin is in an enable state, the first SERDES PHY layer circuit enters a calibration state from the calibration preparation state, so as to perform current calibration by using the reference resistor electrically connected to the first reference resistor pad. After the current calibration is completed, the first SERDES PHY layer circuit enters a calibration completion state from the calibration state to stop using the reference resistor and electrically connect the first calibration input pin to the first calibration output pin. When the first SERDES PHY layer circuit is not in the calibration completion state, the first SERDES PHY layer circuit does not electrically connect the first calibration input pin to the first calibration output pin, and sets a signal of the first calibration output pin to a disable state.

An embodiment of the invention provides an operation method of a SERDES PHY layer circuit, which includes following steps. When the SERDES PHY layer circuit is in a calibration preparation state and a signal of a calibration input pin of the SERDES PHY layer circuit is in an enable state, the SERDES PHY layer circuit enters a calibration state from the calibration preparation state, such that the SERDES PHY layer circuit performs current calibration by using a reference resistor. After the current calibration is completed, the SERDES PHY layer circuit enters a calibration completion state to stop using the reference resistor and electrically connect the calibration input pin to a calibration output pin of the SERDES PHY layer circuit. When the SERDES PHY layer circuit is not in the calibration completion state, the calibration input pin is disconnected from the calibration output pin, and a signal of the calibration output pin is set to a disable state.

An embodiment of the invention provides an operation method of a SERDES PHY layer circuit, which includes following steps. When the SERDES PHY layer circuit is in a calibration preparation state and a signal of a first calibration input pin of the SERDES PHY layer circuit is in an enable state and a signal of a second calibration input pin of the SERDES PHY layer circuit is in the enable state, the SERDES PHY layer circuit enters a calibration state from the calibration preparation state, such that the SERDES PHY layer circuit performs current calibration by using a reference resistor. After the current calibration is completed, the SERDES PHY layer circuit enters a calibration completion state to stop using the reference resistor and electrically connect the first calibration input pin to a first calibration output pin of the SERDES PHY layer circuit. When the SERDES PHY layer circuit is not in the calibration completion state, the first calibration input pin is disconnected from the first calibration output pin, and a signal of the first calibration output pin is set to a disable state.

According to the above descriptions, the integrated circuit and the operation method of the SERDES PHY layer circuits of the invention provide a mechanism to ensure that the SERDES PHY layer circuits do not simultaneously use a same reference resistor. Therefore, the SERDES PHY layer circuits may commonly use the same reference resistor in time division, so as to greatly save the amount of reference resistors used for the current calibration.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

A term "couple (or connect)" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. Moreover, wherever possible, components/members/steps using the same referential numbers in the drawings and description refer to the same or like parts. Components/members/steps using the same referential numbers or using the same terms in different embodiments may cross-refer related descriptions.

Figure 2:
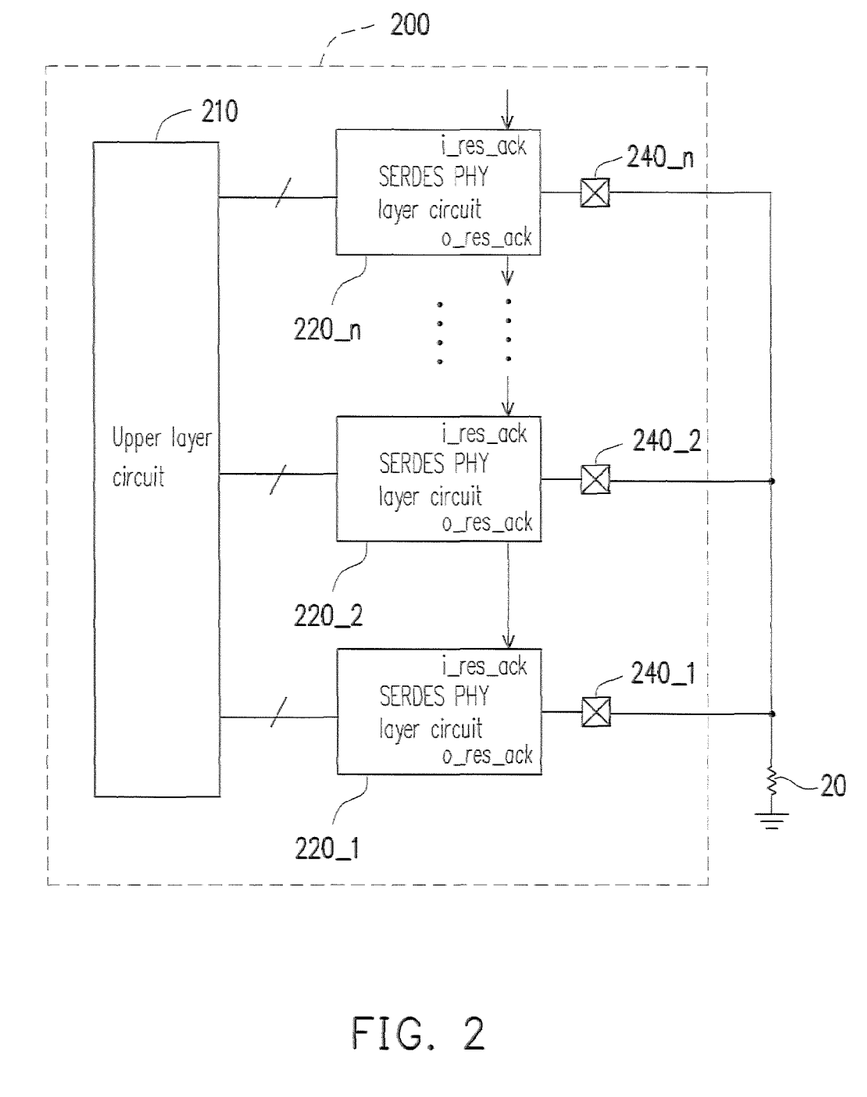
FIG. 2 is a circuit block diagram of an integrated circuit according to an embodiment of the invention.

FIG. 2 is a circuit block diagram of integrated circuit 200 according to an embodiment of the invention. Referring to FIG. 2, the integrated. circuit 200 includes an upper layer circuit 210, a plurality of serializer/deserializer physical layer circuits (for example, 220_1, 220_2, ..., 220_n shown in FIG. 2) and at least one reference resistor pad (for example, 240_1, 240_2, ..., 240_n shown in FIG. 2). In following descriptions. serializer/deserializer is referred to as "SERDES", and physical layer is referred to as "PHY" layer.

The upper layer circuit 210 can be a data link layer, a network layer and/or other functional circuit. In some embodiments, the upper layer circuit 210 of FIG. 2 can be deduced according to related description of the upper layer circuit 110 of FIG. 1. The SERDES PHY layer circuits 220_1-220_n respectively have a data pin. The data pins of the SERDES PHY layer circuits 220_1-220_n are electrically coupled to the upper layer circuit 210. The SERDES PHY layer circuits 220_1-220_n may transform parallel data output by the upper layer circuit 210 into serial data, and supply the serial data to a next level circuit (not shown, for example, other circuit in internal of the integrated circuit 200, and/or a circuit outside the integrated circuit 200); and/or receive serial data from a upper level circuit (not shown, for example, other circuit in internal of the integrated circuit 200, and/or a circuit outside the integrated circuit 200), and transform the serial data into parallel data for providing to the upper layer circuit 210. For example, the SERDES PHY layer circuit 220_1 may transform first parallel data output by the upper layer circuit 210 into first serial data, and/or transform second serial data into second parallel data for providing to the upper layer circuit 210. The SERDES PHY layer circuit 220_2 may transform third parallel data output by the upper layer circuit 210 into third serial data, and/or transform fourth serial data into fourth parallel data for providing to the upper layer circuit 210. Other SERDES PHY layer circuits (for example, 220_n) can be deduced according to related description of the SERDES PHY layer circuit 220_1. Transformation of the serial data and the parallel data performed by the SERDES PHY layer circuits 220_1-220_n may refer to related description of the SERDES PHY layer circuits 120_1-120_n of FIG. 1, or refer to other conventional SERDES PHY layer circuits, and detail thereof is not repeated.

The SERDES PHY layer circuits 220_1-220_n respectively have a reference resistor pin. The reference resistor pins of the SERDES PHY layer circuits 220_ 1-220_n are respectively and electrically connected to the reference resistor pads 240 1-240_n, as shown in FIG. 2. The reference resistor pads 240_1-240_n are commonly and electrically connected to a reference resistor 20 located outside the integrated circuit 200. During an initial phase that power is supplied to the SERDES PHY layer circuits 220_1-220_n, or when the SE ES PHY layer circuits 220_1-220_n are reset, the SERDES PHY layer circuits 220_1-220_n ay enter an initialization period. During the initialization period, the SERDES PHY layer circuits 220_1-220_n perform a plurality of initialization operations including current calibration. Regarding the current calibration, the SE ES PHY layer circuits 220_1-220_n may simultaneously (or not simultaneously) enter a calibration preparation state (or referred to as an idle state). In any case, the SERDES PHY layer circuits 220_1-220_n respectively performed a "determination operation" (operation shown in following FIG. 4 or FIG. 7, which is described later). Based on the "determination operation" respectively performed by the SERDES PHY layer circuits 220_1-220_n, it is guaranteed that no more than one circuit is in a calibration state at a same time, so that the SERDES PHY layer circuits 220_1-220_n may commonly use the reference resistor 20 electrically connected to the reference resistor pads 240_1-240_n in time division to implement the current calibration.

The SERDES PHY layer circuits 220_1-220_n may respectively have a first calibration input pin i_res_ack and a first calibration output pin o_res_ack. The first calibration output pin o_res_ack of the SERDES PHY layer circuit 220_2 is electrically connected to the first calibration input pin i_res_ack of the SERDES PHY layer circuit 220_1. Other SE ES PHY layer circuits (for example, 220_n) can be deduced according to related description of the SERDES PHY layer circuits 220_1 and 220_2.

Figure 3:
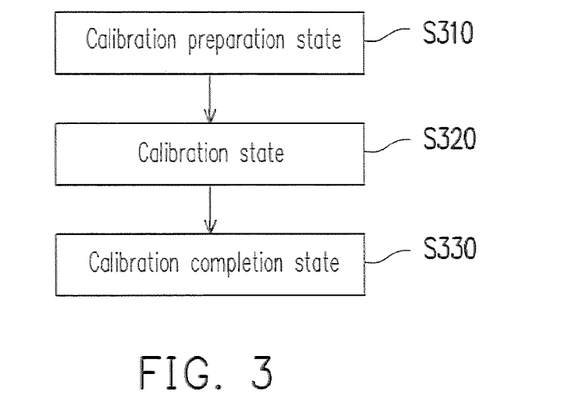
FIG. 3 is a schematic diagram of operation states of a SERDES PHY layer circuit according to an embodiment of the invention.
Figure 4:
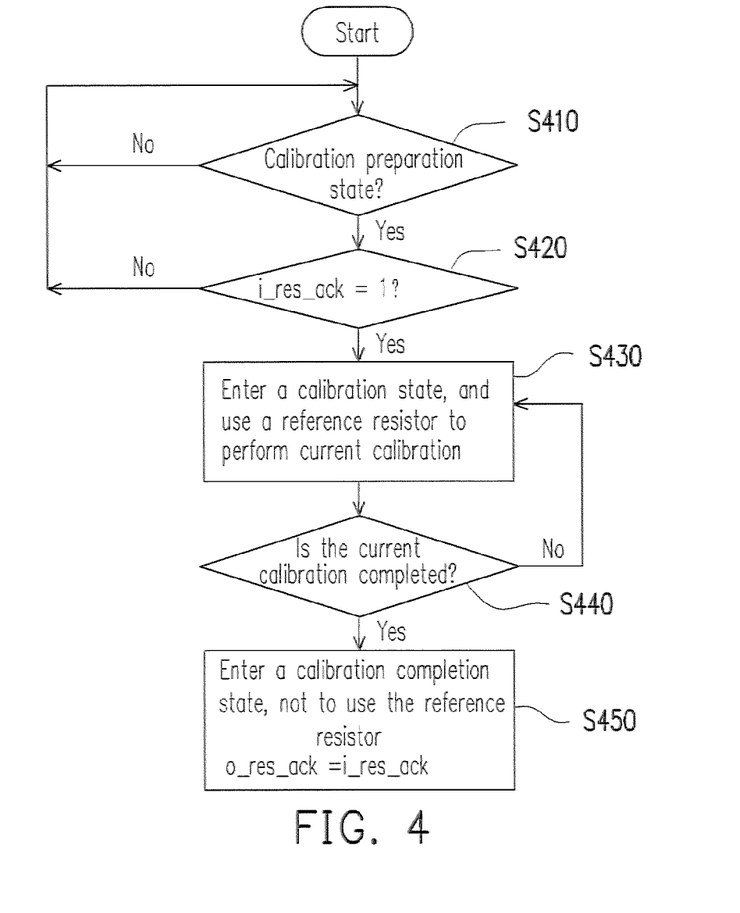
FIG. 4 is a flowchart illustrating an operation method of a SERDES PHY layer circuit according to an embodiment of the invention.

FIG. 3 is a schematic diagram of operation states of the SERDES PHY layer circuit according to an embodiment of the invention. FIG. 4 is a flowchart illustrating an operation method of the SERDES PHY layer circuit according to an embodiment of the invention. When the SERDES PHY layer circuits 220_1-220_n are not in a calibration completion state S330, the SERDES PHY layer circuits 220_1-220_n respectively maintain a signal of the first calibration output pin o_res_ack thereof to a "disable state". An actual logic level of the "disable state" can be determined according to an actual design requirement. For example (but the invention is not limited thereto), the "disable state" of the present embodiment can be logic "0".

The SERDES PHY layer circuit 220_n of FIG. 2 is taken as an example for description, and other SERDES PHY layer circuits 220_1 and 220_2 can be deduced according to related description of the SERDES PHY layer circuit 220_n. Referring to FIG. 2 to FIG. 4, during an initial phase that power is supplied to the SERDES PHY layer circuit 220_n, or when the SERDES PHY layer circuit 220_n is reset, the SERDES PHY layer circuit 220_n may enter the initialization period. During the initialization period, the SERDES PHY layer circuit 220_n may enter the calibration preparation state S310, and a control circuit (or system, which is not shown) may provide a signal with an enable state to the first calibration input pin i_res_ack of the SERDES PHY layer circuit 220_n to prepare performing the current calibration. An actual logic level of the "enable state" can be determined according to an actual design requirement. For example (but the invention is not limited thereto), the "enable state" of the present embodiment can be logic "1".

In step S410 of FIG. 4, the SERDES PHY layer circuit 220_n determines whether a current operation state is the calibration preparation state S310. If the operation state of the SERDES PHY layer circuit 220_n is the calibration preparation state S310, a step S420 is executed. In the step S420, the SERDES PHY layer circuit 220_n determines whether a signal of the first calibration input pin $i_{13}$ res$_{13}$ ack of the SERDES PHY layer circuit 220_n is in the "enable state" (for example, logic "1"). When the SERDES PHY layer circuit 220_n is in the calibration preparation state S310, and the signal of the first calibration input pin i_res_ack of the SERDES PHY layer circuit 220_n is in the "enable state" (for example, logic "1"), the SERDES PHY layer circuit 220_n enters the calibration state S320 from the calibration preparation state S310, and performs current calibration by using the reference resistor 20 electrically connected to the reference resistor pad 240$_{13}$ n (step S430).

When the SERDES PHY layer circuit 220_n is not in the calibration completion state S330, the first calibration input pin i_res_ack of the SERDES PHY layer circuit 220_n is not electrically connected to the first calibration output pin o_res_ack of the SERDES PHY layer circuit 220_n, and a signal of the first calibration output pin o_res_ack of the SERDES PHY layer circuit 220_n is maintained to the disable state (for example, logic "0"). Deduced by analogy, signals of the first calibration output pins o_res_ack of the other SERDES PHY layer circuits (for example, 220_1 and 220_2) are also maintained to the disable state. Therefore, besides the SERDES PHY layer circuit 220_n in the calibration state S320 may perform the current calibration by using the reference resistor 20, the other SERDES PHY layer circuits are still in the calibration preparation state S310 without using the reference resistor 20.

In step S440, the SERDES PHY layer circuit 220_n determines whether the operation of current calibration of the step S430 is completed. In the present embodiment, the operation of "current calibration" is not limited by the invention. In some applications, the operation of "current calibration" can be similar (or the same) to current calibration of the conventional SERDES PHY layer circuit. After the current calibration of the SERDES PHY layer circuit 220_n is completed, the SERDES PHY layer circuit 220_n enters the calibration completion state S330 from the calibration state S320, and stops using the reference resistor 20 and electrically connects the first calibration input pin i_res_ack of the SERDES PHY layer circuit 220_n to the first calibration output pin o_res_ack of the SERDES PHY layer circuit 220_n (step S450). Therefore, the signal with the enable state (for example, logic "1") at the first calibration input pin i_res_ack of the SERDES PHY layer circuit 220_n can be transmitted to the first calibration input pin i_res_ack of the next SERDES PHY layer circuit through the first calibration output pin o_res_ack of the SERDES PHY layer circuit 220_n, so as to trigger the next SERDES PHY layer circuit to enter the calibration state S320. Therefore, the SERDES PHY layer circuits 220_1-220_n may alternately use the reference resistor 20 in time division, so as to avoid a change of a reference current provided by the reference resistor 20 due to a parallel effect.

Figure 5:
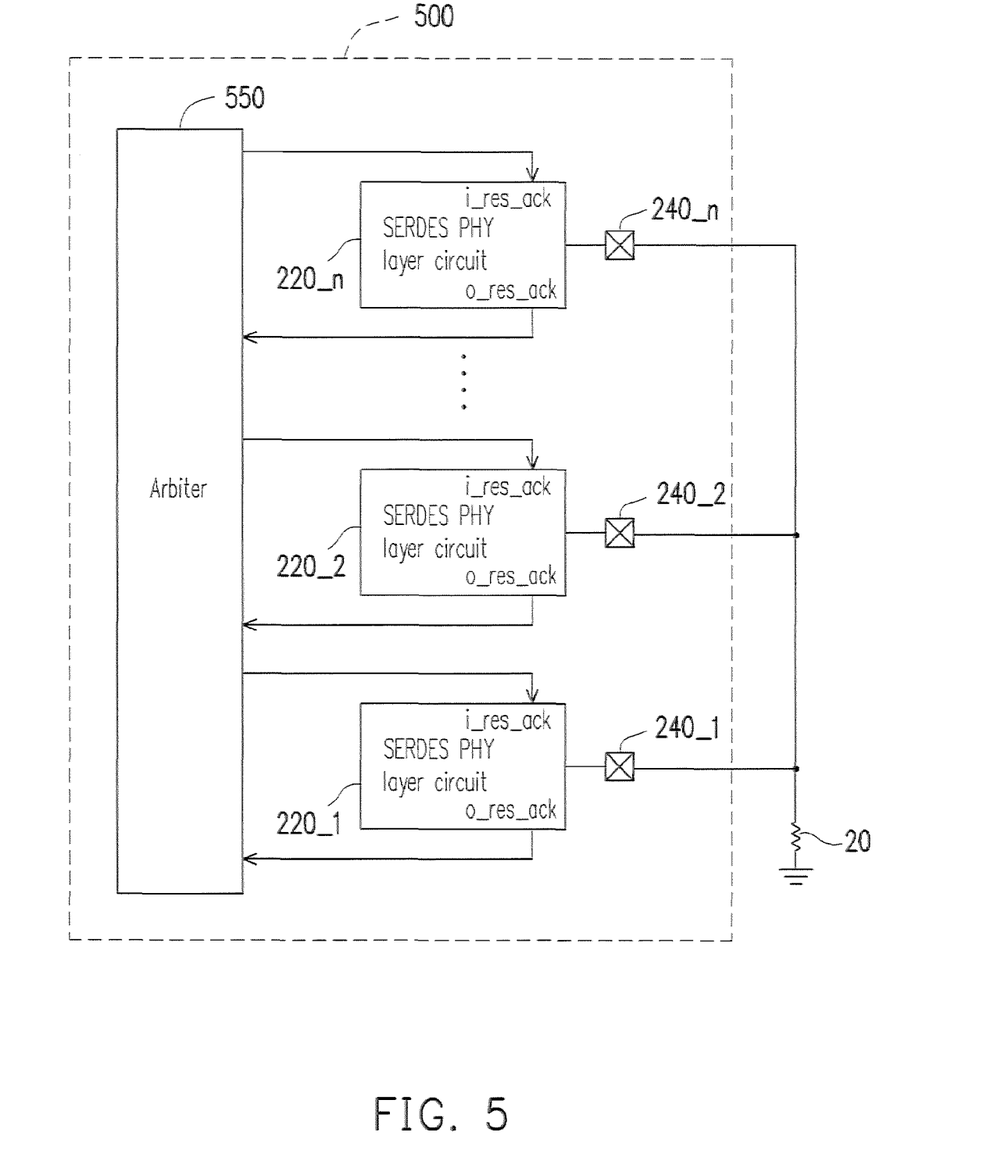
FIG. 5 is a circuit block diagram of an integrated circuit according to another embodiment of the invention.

FIG. 5 is a circuit block diagram of an integrated circuit 500 according to another embodiment of the invention. The integrated circuit 500 includes an upper layer circuit (not shown, which can be deduced according to related description of the upper layer circuit 210 of FIG. 2). The integrated circuit 500 of FIG. 5 further includes a plurality of SERDES PHY layer circuits 220_1-220_n, a plurality of reference resistor pads 240_1-240_n and an arbiter 550. The SERDES PHY layer circuits 220_1-220_n, the reference resistor pads 240_1-240_n and the reference resistor 20 can be deduced according to related descriptions of FIG. 2, and details thereof are not repeated.

Referring to FIG. 5, the arbiter 550 is coupled to the first calibration input pin i_res_ack of the SERDES PHY layer circuit 220_1, the first calibration output pin o_res_ack of the SERDES PHY layer circuit 220_1, the first calibration input pin i_res_ack of the SERDES PHY layer circuit 220_2, the first calibration output pin o_res_ack of the SERDES PHY layer circuit 220_2, . . . , the first calibration input pin i_res_ack of the SERDES PHY layer circuit 220_n and the first calibration output pin o_res_ack of the SERDES PHY layer circuit 220_n. The arbiter 550 may provide an enable state signal to the first calibration input pin i_res_ack of one of the SERDES PHY layer circuits 220_1-220_n during a first period, for example, the first calibration input pin i_res_ack of the SERDES PHY layer circuit 220_1, so as to trigger the SERDES PHY layer circuit 220_1 to enter the calibration state S320 (it is assumed that the SERDES PHY layer circuit 220_1 has been in the calibration preparation state S310 and waits for the enable state signal of the first calibration input pin i_res_ack). During the first period, the arbiter 550 outputs a signal with the disable state to the first calibration input pins i_res_ack of the other SERDES PHY layer circuits (for example, the SERDES PHY layer circuits 220_2-220_n). When the signal of the first calibration output pin o_res_ack of the SERDES PRY layer circuit 220_1 is in the enable state, the arbiter 550 ends the first period and enters a second period.

The arbiter 550 provides the enable state signal to the first calibration input pin i_res_ack of another one of the SERDES PHY layer circuits 220_1-220_n during the second period, for example, the first calibration input pin i_res_ack of the SERDES PHY layer circuit 220_2, so as to trigger the SERDES PHY layer circuit 220_2 to enter the calibration state S320 (it is assumed that the SERDES PHY layer circuit 220_2 has been in the calibration preparation state S310 and waits for the enable state signal of the first calibration input pin i_res_ack). During the second period, the arbiter 550 outputs the signal with the disable state to the first calibration input pins i_res_ack of the other SERDES PHY layer circuits (for example, the SERDES PHY layer circuits 220_1 and 220_n). When the signal of the first calibration output pin o_res_ack of the SERDES PHY layer circuit 220_2 is in the enable state, the arbiter 550 ends the second period and enters a third period. Operations of the third period can be deduced by analogy. Therefore, the SERDES PHY layer circuits 220_1-220_n shown in FIG. 5 may alternately use the same reference resistor 20 in time division, so as to avoid a change of the reference current provided by the reference resistor 20 due to the parallel effect.

Figure 6:
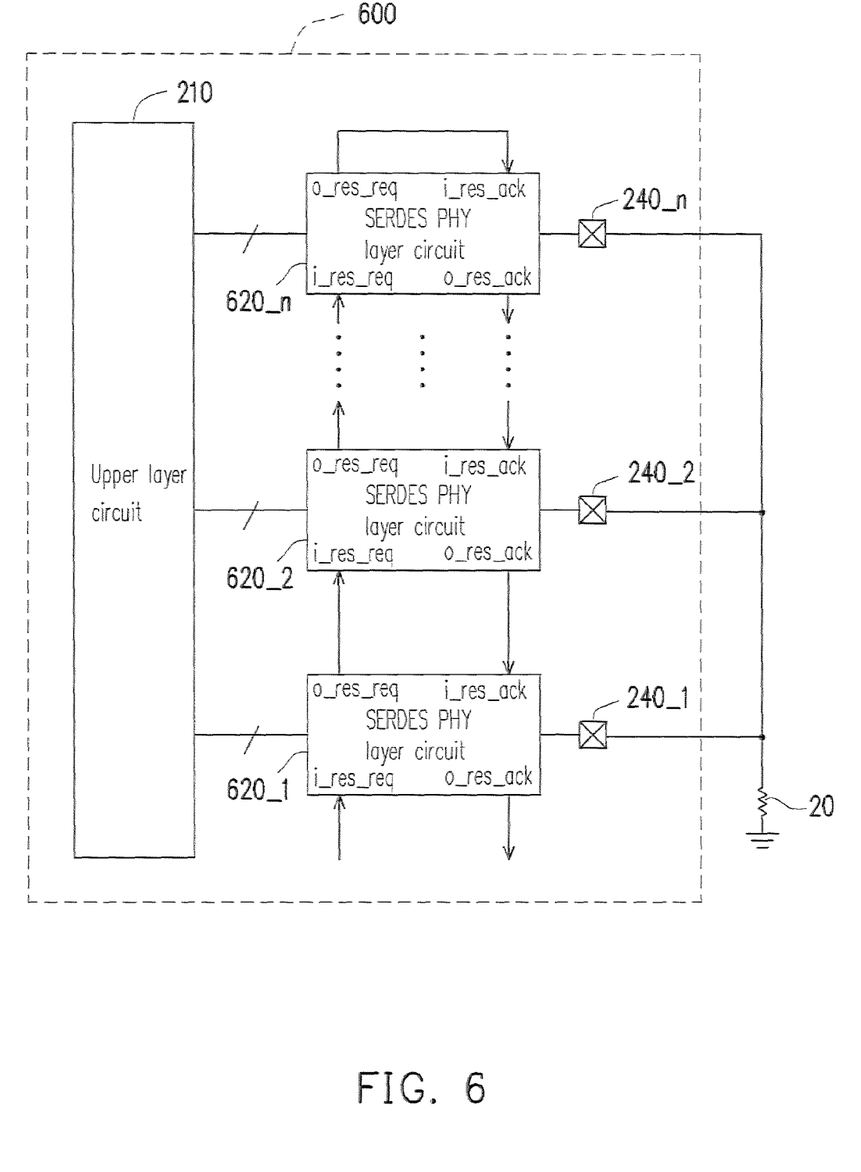
FIG. 6 is a circuit block diagram of an integrated circuit according to still another embodiment of the invention.

FIG. 6 is a circuit block diagram of an integrated circuit 600 according to still another embodiment of the invention. Referring to FIG. 6, the integrated circuit 600 includes the upper layer circuit 210, a plurality of SERDES PHY layer circuits (for example, 620_1, 620_2, . . . , 620_n shown in FIG. 6) and at least one reference resistor pad (for example, 240_1-240_n shown in FIG. 6). The upper layer circuit 210, the reference resistor pads 240_1-240_n and the reference resistor 20 of FIG. 6 can be deduced according to related description of FIG. 2, and details thereof are not repeated.

The SERDES PHY layer circuits 620_1-620_n respectively have a data pin. The data pins of the SERDES PHY layer circuits 620_1-620_n are electrically coupled to the upper layer circuit 210. The SERDES PHY layer circuits 620_1-620_n may transform parallel data output by the upper layer circuit 210 into serial data, and supply the serial data to a next level circuit (not shown, for example, other circuit in internal of the integrated circuit 600, and/or a circuit outside the integrated circuit 600); and/or the SERDES PHY layer circuits 620_1-620_n receive serial data from a upper level circuit (not shown, for example, other circuit in internal of the integrated circuit 600, and/or a circuit outside the integrated circuit 600), and transform the serial data into parallel data for providing to the upper layer circuit 210. For example, the SERDES PHY layer circuit 620_1 may transform first parallel data output by the upper layer circuit 210 into first serial data, and/or transform second serial data into second parallel data for providing to the upper layer circuit 210. The SERDES PHY layer circuit 620_2 may transform third parallel data output by the upper layer circuit 210 into third serial data, and/or transform fourth serial data into fourth parallel data for providing to the upper layer circuit 210. Other SERDES PHY layer circuits (for example, 620_n) can be deduced according to related description of the SERDES PHY layer circuit 620_1. Transformation of the serial data and the parallel data performed by the SERDES PHY layer circuits 620_1-620_n may refer to related description of the SERDES PHY layer circuits 120_1-120_n of FIG. 1, or refer to other conventional SERDES PHY layer circuits, and detail thereof is not repeated.

The reference resistor pins of the SERDES PHY layer circuits 620_1-620_n are respectively and electrically connected to the reference resistor pads 240_1-240_n, as shown in FIG. 6. The reference resistor pads 240_1-240_n are commonly and electrically connected to the reference resistor 20 located outside the integrated circuit 600. During an initial phase that power is supplied to the SERDES PHY layer circuits 620_1-620_n, or when the SERDES PHY layer circuits 620_1-620_n are reset, the SERDES PHY layer circuits 620_1-620_n may enter an initialization period. During the initialization period, the SERDES PHY layer circuits 620_1-620_n perform a plurality of initialization operations including current calibration. Regarding the current calibration, the SERDES PHY layer circuits 620_1-620_n may simultaneously (or not simultaneously) enter the calibration preparation state (or referred to as the idle state). In any case, the SERDES PHY layer circuits 620_1-620_n respectively perform a "determination operation" (an operation shown in following FIG. 7, which is described later). Based on the "determination operation" respectively performed by the SERDES PHY layer circuits 620_1-620_n, it is guaranteed that no more than one circuit is in the calibration state S320 at a same time, so that the SERDES PHY layer circuits 620_1-620_n may alternately use the reference resistor 20 electrically connected to the reference resistor pads 240_1-240_n in time division to implement the current calibration.

The SERDES PHY layer circuits 620_1-620_n respectively have the first calibration input pin i_res_ack, the first calibration output pin o_res_ack, a second calibration input pin i_res_req, and a second calibration output pin o_res_req. The first calibration output pin o_res_ack of the SERDES PHY layer circuit 620_2 is electrically connected to the first calibration input pin i_res_ack of the SERDES PHY layer circuit 620_1, and the second calibration input pin i_res_req of the SERDES PHY layer circuit 620_2 is electrically connected to the second calibration output pin o_res_req of the SERDES PHY layer circuit 620_1. The other SERDES PHY layer circuits (for example, 620_n) can be deduced according to related descriptions of the SERDES PHY layer circuits 620_1 and 620_2. The second calibration output pin o_res_req of the SERDES PHY layer circuit 620_n is electrically connected to the first calibration input pin i_res_ack of the SERDES PHY layer circuit 620_n.

During an initial phase that power is supplied to the SERDES PHY layer circuits 620_1-620_n, or when the SERDES PHY layer circuits 620_1-620_n are reset, the SERDES PHY layer circuits 620_1-620_n may enter the initialization period.

During the initialization period, the SERDES PHY layer circuits 620_1-620_n may enter the calibration preparation state S310, and a control circuit (or system, which is not shown) may provide a signal with the "enable state" (for example, logic "1") to the second calibration input pin i_res_req of the SERDES PHY layer circuit 620_1 to prepare performing the current calibration. When the SERDES PHY layer circuits 620_1-620_n are not in the calibration completion state S330, the SERDES PHY layer circuits 620_1-620_n respectively maintain the signal of the first calibration output pin o_res_ack thereof to the "disable state" (for example, logic "0").

The SERDES PHY layer circuit 620_1 samples the signal of the second calibration input pin i_res_req to obtain a sampled signal, and the SERDES PHY layer circuit 620_1 outputs the sampled signal to the SERDES PITY layer circuit 620_2 through the second calibration output pin o_res_req. Operations of the pins i_res_req and o_res_req of the other SERDES PHY layer circuits 620_2-620_n can be deduced according to related description of the SERDES PHY layer circuit 620_1. Therefore, the enable state signal provided by the control circuit (or system, which is not shown) is transmitted to the first calibration input pin i_res_ack of the SERDES PHY layer circuit 620_n.

Figure 7:
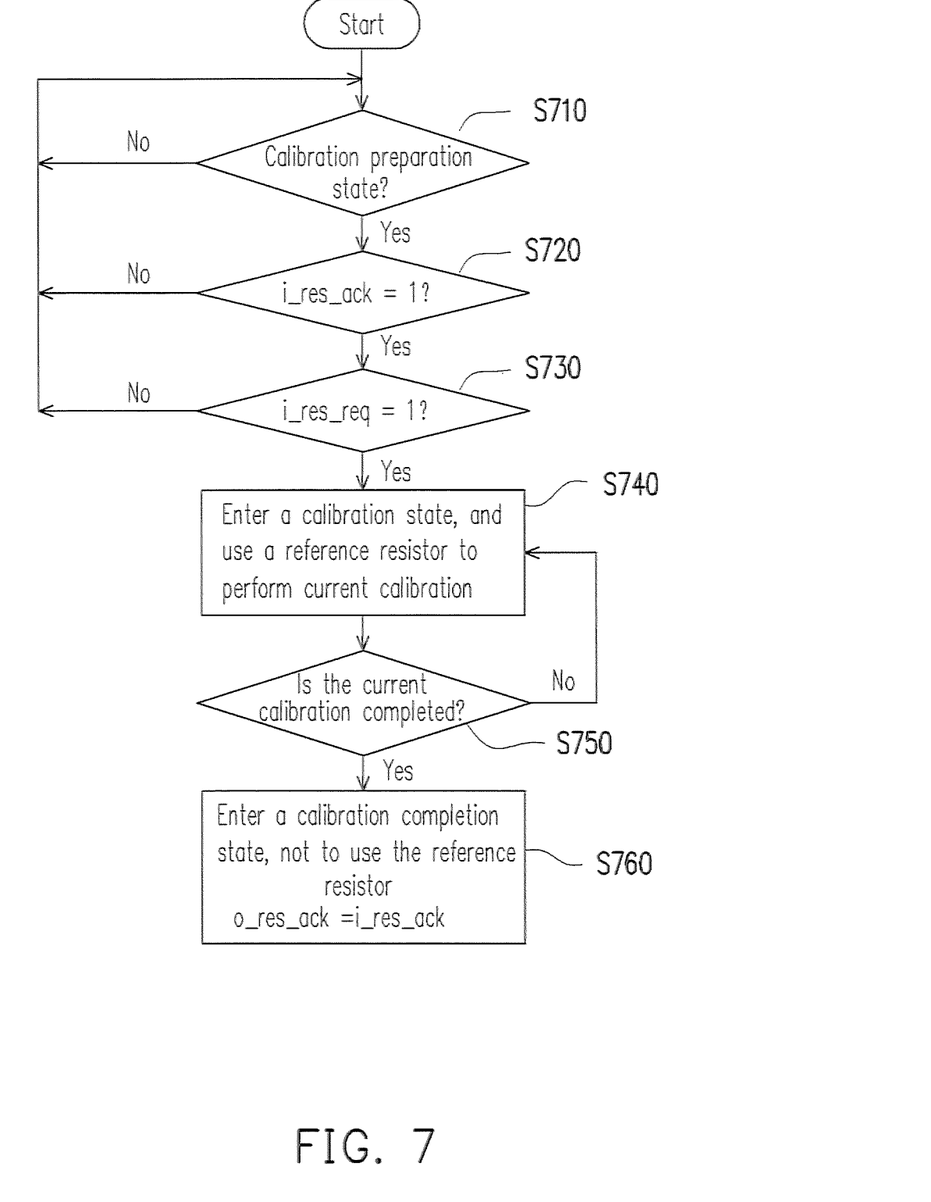
FIG. 7 is a flowchart illustrating an operation method of a SERDES PHY layer circuit according to still another embodiment of the invention.

FIG. 7 is a flowchart illustrating an operation method of a SERDES PHY layer circuit according to still another embodiment of the invention. The SERDES PHY layer circuit 620_n of FIG. 6 is taken as an example for description, and other SERDES PHY layer circuits (for example, 620_1 and 620_n) can be deduced according to related description of the SERDES PHY layer circuit 620_n. Referring to FIG. 6 and FIG. 7, in step S710, the SERDES PHY layer circuit 620_n determines whether a current operation state is the calibration preparation state S310. If the operation state of the SERDES PHY layer circuit 620_n is the calibration preparation state S310, a step S720 is executed. In the step S720, the SERDES PHY layer circuit 620_n determines whether a signal of the first calibration input pin i_res_ack of the SERDES PHY layer circuit 620_n is in the "enable state" (for example, logic "1"). When the signal of the first calibration input pin i_res_ack of the SERDES PHY layer circuit 620_n is in the "enable state" (for example, logic "1"), a step S730 is executed. In the step S730, the SERDES PHY layer circuit 620_n determines whether a signal of the second calibration input pin i_res_req of the SERDES PHY layer circuit 620_n is in the "enable state" (for example, logic "1"). When the SERDES PHY layer circuit 620_n is in the calibration preparation state S310, and the signal of the first calibration input pin i_res_ack of the SERDES PHY layer circuit 620_n is in the "enable state" (for example, logic "1") and the signal of the second calibration input pin i_res_req of the SERDES PHY layer circuit 620_n is in the "enable state" (for example, logic "1"), the SERDES PHY layer circuit 620_n enters the calibration state S320 from the calibration preparation state S310, and performs current calibration by using the reference resistor 20 electrically connected to the reference resistor pad 240_n (step S740).

When the SERDES PHY layer circuit 620_n is not in the calibration completion state S330, the first calibration input pin i_res_ack of the SERDES PHY layer circuit 620_n is disconnected from the first calibration output pin o_res_ack of the SERDES PHY layer circuit 620_n, and a signal of the first calibration output pin o_res_ack of the SERDES PHY layer circuit 620_n is maintained to the disable state (for example, logic "0"). Deduced by analogy, signals of the first calibration output pins o_res_ack of the other SERDES PHY layer circuits (for example, 620_1 and 620_2) are also maintained to the disable state. Therefore, besides the SERDES PHY layer circuit 620_n in the calibration state S320 may perform the current calibration by using the reference resistor 20, the other SERDES PHY layer circuits are still in the calibration preparation state S310 without using the reference resistor 20.

In step S750, the SERDES PHY layer circuit 620_n determines whether the operation of current calibration of the step S740 is completed. In the present embodiment, the operation of "current calibration" is not limited by the invention. In some applications, the operation of "current calibration" can be similar (or the same) to current calibration of the conventional SERDES PHY layer circuit. After the current calibration of the SERDES PHY layer circuit 620_n is completed, the SERDES PHY layer circuit 620_n enters the calibration completion state S330 from the calibration state S320, and stops using the reference resistor 20 and electrically connects the first calibration input pin i_res_ack of the SERDES PHY layer circuit 620_n to the first calibration output pin o_res_ack of the SERDES PHY layer circuit 620_n (step S760). Therefore, the enable state signal (for example, logic "1") of the first calibration input pin i_res_ack of the SERDES PHY layer circuit 620_n can be transmitted to the first calibration input pin i_res_ack of the next SERDES PHY layer circuit through the first calibration output pin o_res_ack of the SERDES PHY layer circuit 620_n, so as to trigger the next SERDES PHY layer circuit to enter the calibration state S320. Therefore, the SERDES PHY layer circuits 620_1-620_n may alternately use the reference resistor 20 in time division, so as to avoid a change of the reference current provided by the reference resistor 20 due to the parallel effect.

It should be noted that in different application situations, related functions of the aforementioned control circuit (or system, which is not shown), the upper layer circuit 210 and/or the arbiter 550 can be implemented as software, firmware or hardware by using general programming languages, for example, C or C++, hardware description languages, for example, Verilog HDL or VHDL or other suitable programming languages. In different application situations, related functions of the aforementioned SERDES PHY layer circuits 220_1-220_n and/or the SERDES PHY layer circuits 620_1-620_n can be implemented as firmware or hardware by using hardware description languages, for example, Verilog HDL or VHDL or other suitable programming languages. The software (or firmware) capable of implementing the related functions can be stored in any computer-assessable medias, for example, magnetic tapes, semiconductor memories, magnetic disks or compact disks, for example, CD-ROM or DVD-ROM, or the software (or firmware) can be transmitted through the Internet, wired communication, wireless communication or other communication media. The software (or firmware) can be stored in the computer-assessable medias to facilitate a processor of the computer to access/execute programming codes of the software (or firmware). Moreover, the apparatus and method of the invention can be implemented through a combination of hardware and software.

In summary, the integrated circuit (for example, 200, 500 and/or 600) and the operation method of the SERDES PHY layer circuits (for example, 220_1-220_n and/or 620_1-620_n) of the invention provide a mechanism to ensure that the SERDES PHY layer circuits do not simultaneously use the same reference resistor 20. Therefore, the SERDES PHY layer circuits 220_1-220_n (or 620_1-620_n) may commonly use the same reference resistor 20 in time division, so as to neatly save the amount of reference resistors used for the current calibration.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An integrated circuit, comprising:
a first reference resistor pad, configured to electrically connect a reference resistor located outside the integrated circuit;
an upper layer circuit;
a first serializer/deserializer physical layer circuit, having a data pin electrically coupled to the upper layer circuit, and configured to transform first parallel data output by the upper layer circuit into first serial data, or transform second serial data into second parallel data for providing to the upper layer circuit, wherein the first serializer/deserializer physical layer circuit further has a reference resistor pin, a first calibration input pin and a first calibration output pin, the reference resistor pin is electrically connected to the first reference resistor pad, the first serializer/deserializer physical layer circuit enters a calibration state from a calibration preparation state so as to perform current calibration by using the reference resistor electrically connected to the first reference resistor pad when the first serializer/deserializer physical layer circuit is in the calibration preparation state and a signal of the first calibration input pin is in an enable state, the first serializer/deserializer physical layer circuit enters a calibration completion state from the calibration state to stop using the reference resistor and electrically connect the first calibration input pin to the first calibration output pin after the current calibration is completed, and the first serializer/deserializer physical layer circuit does not electrically connect the first calibration input pin to the first calibration output pin and sets a signal of the first calibration output pin to a disable state when the first serializer/deserializer physical layer circuit is not in the calibration completion state;
a second reference resistor pad, configured to electrically connect the reference resistor located outside the integrated circuit; and
a second serializer/deserializer physical layer circuit, having a second data pin electrically coupled to the upper layer circuit, and configured to transform third parallel data output by the upper layer circuit into third serial data, or transform fourth serial data into fourth parallel data for providing to the upper layer circuit, wherein the second serializer/deserializer physical layer circuit further has a reference resistor pin, a first calibration input pin and a first calibration output pin, the reference resistor pin of the second serializer/deserializer physical layer circuit is electrically connected to the second reference resistor pad, and the first calibration output pin of the second serializer/deserializer physical layer circuit is electrically connected to the first calibration input pin of the first serializer/deserializer physical layer circuit.

2. The integrated circuit as claimed in claim 1, wherein the first serializer/deserializer physical layer circuit further has a second calibration input pin and a second calibration output pin, the first serializer/deserializer physical layer circuit samples a signal of the second calibration input pin to obtain a sampled signal, and the first serializer/deserializer physical layer circuit outputs the sampled signal through the second calibration output pin, and the first serializer/deserializer physical layer circuit enters the calibration state from the calibration preparation state when the first serializer/deserializer physical layer circuit is in the calibration preparation state and the signal of the first calibration input pin is in the enable state and a signal of the second calibration input pin is in the enable state.

3. The integrated circuit as claimed in claim 2, wherein the second serializer/deserializer physical layer circuit further has a second calibration input pin and a second calibration output pin, and the second calibration input pin of the second serializer/deserializer physical layer circuit is electrically connected to the second calibration output pin of the first serializer/deserializer physical layer circuit.

4. The integrated circuit as claimed in claim 3, wherein the second calibration output pin of the second serializer/deserializer physical layer circuit is electrically connected to the first calibration input pin of the second serializer/deserializer physical layer circuit.

5. An operation method of serializer/deserializer physical layer circuits, comprising:
making a first serializer/deserializer physical layer circuit to enter a calibration state from a calibration preparation state when the first serializer/deserializer physical layer circuit is in the calibration preparation state and a signal of a calibration input pin of the first serializer/deserializer physical layer circuit is in an enable state, so as to perform current calibration for the first serializer/deserializer physical layer circuit by using a reference resistor;
making the first serializer/deserializer physical layer circuit to enter a calibration completion state to stop using the reference resistor and electrically connect the calibration input pin of the first serializer/deserializer physical layer circuit to a calibration input pin of a second serializer/deserializer physical layer circuit through a calibration output pin of the first serializer/deserializer physical layer circuit after the current calibration is completed;
disconnecting the calibration input pin of the first serializer/deserializer physical layer circuit from the calibration output pin of the first serializer/deserializer physical layer circuit and setting a signal of the calibration output pin of the first serializer/deserializer physical layer circuit to a disable state when the first serializer/deserializer physical layer circuit is not in the calibration completion state;
making the second serializer/deserializer physical layer circuit to enter the calibration state from the calibration preparation state when the second serializer/deserializer physical layer circuit is in the calibration preparation state and a signal of the calibration input pin of the second serializer/deserializer physical layer circuit is in an enable state, so as to perform current calibration for the second serializer/deserializer physical layer circuit by using the reference resistor;
making the second serializer/deserializer physical layer circuit to enter the calibration completion state to stop using the reference resistor and electrically connect the calibration input pin of the second serializer/deserializer physical layer circuit to a calibration output pin of the second serializer/deserializer physical layer circuit after the current calibration is completed; and
disconnecting the calibration input pin of the second serializer/deserializer physical layer circuit from the calibration output pin of the second serializer/deserializer physical layer circuit and setting a signal of the calibration output pin of the second serializer/deserializer physical layer circuit to a disable state when the second serializer/deserializer physical layer circuit is not in the calibration completion state.

6. An integrated circuit, comprising:

a first reference resistor pad, configured to electrically connect a reference resistor located outside the integrated circuit;

an upper layer circuit;

a first serializer/deserializer physical layer circuit, having a data pin electrically coupled to the upper layer circuit, and configured to transform first parallel data output by the upper layer circuit into first serial data, or transform second serial data into second parallel data for providing to the upper layer circuit, wherein the first serializer/deserializer physical layer circuit further has a reference resistor pin, a first calibration input pin and a first calibration output pin, the reference resistor pin is electrically connected to the first reference resistor pad, the first serializer/deserializer physical layer circuit enters a calibration state from a calibration preparation state so as to perform current calibration by using the reference resistor electrically connected to the first reference resistor pad when the first serializer/deserializer physical layer circuit is in the calibration preparation state and a signal of the first calibration input pin is in an enable state, the first serializer/deserializer physical layer circuit enters a calibration completion state from the calibration state to stop using the reference resistor and electrically connect the first calibration input pin to the first calibration output pin after the current calibration is completed, and the first serializer/deserializer physical layer circuit does not electrically connect the first calibration input pin to the first calibration output pin and sets a signal of the first calibration output pin to a disable state when the first serializer/deserializer physical layer circuit is not in the calibration completion state;

a second reference resistor pad, configured to electrically connect the reference resistor located outside the integrated circuit;

a second serializer/deserializer physical layer circuit, having a data pin electrically coupled to the upper layer circuit, and configured to transform third parallel data output by the upper layer circuit into third serial data, or transform fourth serial data into fourth parallel data for providing to the upper layer circuit, wherein the second serializer/deserializer physical layer circuit further has a reference resistor pin, a first calibration input pin and a first calibration output pin; and an arbiter, coupled to the first calibration input pin of the first serializer/deserializer physical layer circuit, the first calibration output pin of the first serializer/deserializer physical layer circuit, the first calibration input pin of the second serializer/deserializer physical layer circuit and the first calibration output pin of the second serializer/deserializer physical layer circuit, wherein the arbiter provides an enable state signal to the first calibration input pin of the first serializer/deserializer physical layer circuit during to a first period to trigger the first serializer/deserializer physical layer circuit to enter the calibration state, the arbiter ends the first period when the signal of the first calibration output pin of the first serializer/deserializer physical layer circuit is in the enable state, the arbiter provides an enable state signal to the first calibration input pin of the second serializer/deserializer physical layer circuit during to a second period to trigger the second serializer/deserializer physical layer circuit to enter the calibration state, and the arbiter ends the second period when a signal of the first calibration output pin of the second serializer/deserializer physical layer circuit is in the enable state.

* * * * *